United States Patent
Stuckey et al.

(10) Patent No.: US 8,955,630 B2
(45) Date of Patent: Feb. 17, 2015

(54) SYMBIOTIC ENGINE INTAKE SYSTEM AND BATTERY BOX

(71) Applicants: Joshua Stuckey, Leola, PA (US); James Robinson, Delaware, OH (US); Justin J. Chiodo, Manhattan Beach, CA (US); Mahendra Kute, Northville, MI (US); Brandy Kay Laakso, Marysville, OH (US)

(72) Inventors: Joshua Stuckey, Leola, PA (US); James Robinson, Delaware, OH (US); Justin J. Chiodo, Manhattan Beach, CA (US); Mahendra Kute, Northville, MI (US); Brandy Kay Laakso, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 38 days.

(21) Appl. No.: 13/714,998

(22) Filed: Dec. 14, 2012

(65) Prior Publication Data
US 2013/0153316 A1    Jun. 20, 2013

Related U.S. Application Data

(60) Provisional application No. 61/570,362, filed on Dec. 14, 2011.

(51) Int. Cl.
| | |
|---|---|
| *B60K 13/06* | (2006.01) |
| *B60H 1/00* | (2006.01) |
| *H01M 2/10* | (2006.01) |
| *H01M 10/60* | (2014.01) |
| *H01M 10/613* | (2014.01) |
| *H01M 10/625* | (2014.01) |
| *H01M 10/6563* | (2014.01) |

(52) U.S. Cl.
CPC ......... *B60H 1/00278* (2013.01); *H01M 2/1077* (2013.01); *H01M 10/50* (2013.01); *H01M 10/5004* (2013.01); *H01M 10/5016* (2013.01); *H01M 10/5067* (2013.01); *H01M 2220/20* (2013.01)
USPC .......................................... 180/68.5; 180/68.3

(58) Field of Classification Search
CPC ................................ B60K 13/02; B60K 13/06
USPC ................................................ 180/68.3, 68.5
See application file for complete search history.

(56) References Cited

U.S. PATENT DOCUMENTS

| | | | | |
|---|---|---|---|---|
| 2,104,765 | A | | 2/1936 | Saunders |
| 2,104,767 | A | * | 1/1938 | Saunders ..................... 180/68.5 |
| 4,976,327 | A | * | 12/1990 | Abujudom et al. ......... 180/68.2 |
| 5,031,712 | A | * | 7/1991 | Karolek et al. ............. 180/68.2 |
| 5,082,075 | A | * | 1/1992 | Karolek et al. ............. 180/68.2 |
| 5,215,834 | A | * | 6/1993 | Reher et al. ..................... 429/62 |
| 5,320,190 | A | * | 6/1994 | Naumann et al. ............ 180/68.2 |
| 5,490,572 | A | * | 2/1996 | Tajiri et al. .................. 180/65.1 |
| 5,542,489 | A | * | 8/1996 | Allison et al. ............... 180/68.5 |
| 5,547,036 | A | * | 8/1996 | Gawaskar et al. .......... 180/68.5 |
| 5,636,701 | A | * | 6/1997 | Norman et al. ............. 180/68.5 |
| 6,152,096 | A | * | 11/2000 | Setsuda .................... 123/184.21 |

(Continued)

*Primary Examiner* — Jeffrey J Restifo
(74) *Attorney, Agent, or Firm* — Fay Sharpe LLP

(57) ABSTRACT

An engine compartment of an automotive vehicle is provided. The compartment comprises an internal combustion engine including an air intake manifold and an electrical storage battery. The battery is housed in a storage box and an air intake system supplies air to the air intake manifold and the battery storage box. The air intake system has an inlet supplying air to a flow diverter. The flow diverter has a main channel including a bend dividing the main channel into a first passage and a second passage tangential to the first passage. The second passage is in fluid communication with the air intake manifold. The flow diverter includes an outlet facing the first passage which is in fluid communication with the battery storage box.

17 Claims, 7 Drawing Sheets

(56) References Cited

U.S. PATENT DOCUMENTS

| | | | |
|---|---|---|---|
| 6,230,677 B1* | 5/2001 | Setsuda | 123/184.21 |
| 6,230,833 B1* | 5/2001 | Setsuda | 180/68.5 |
| 6,422,197 B1* | 7/2002 | Amann et al. | 123/198 E |
| 6,457,542 B1* | 10/2002 | Hosono et al. | 180/68.1 |
| 6,540,802 B2 | 4/2003 | Trautmann et al. | |
| 6,814,042 B2* | 11/2004 | Cutts et al. | 123/195 C |
| 6,889,672 B2* | 5/2005 | Criddle et al. | 123/559.1 |
| 6,892,713 B2* | 5/2005 | Criddle et al. | 123/559.1 |
| 7,159,557 B2* | 1/2007 | Yasuda et al. | 123/184.57 |
| 7,311,170 B2* | 12/2007 | Isoda et al. | 180/296 |
| 7,469,763 B2* | 12/2008 | Dupuis et al. | 180/68.5 |
| 8,056,664 B2* | 11/2011 | Laakso | 180/68.3 |
| 8,196,689 B2* | 6/2012 | Hosoda | 180/68.4 |
| 8,590,651 B2* | 11/2013 | Shigematsu et al. | 180/68.1 |
| 2003/0226653 A1* | 12/2003 | Takedomi et al. | 165/43 |
| 2004/0065491 A1* | 4/2004 | Dudley et al. | 180/68.5 |
| 2004/0094115 A1* | 5/2004 | Jatzke et al. | 123/198 E |
| 2010/0096201 A1 | 4/2010 | Nagao et al. | |
| 2013/0146378 A1* | 6/2013 | Shigematsu et al. | 180/68.3 |
| 2013/0153316 A1* | 6/2013 | Stuckey et al. | 180/68.5 |

\* cited by examiner

SYMBIOTIC ENGINE INTAKE SYSTEM AND BATTERY BOX

BACKGROUND

The present exemplary embodiment relates to automotive vehicles having an internal combustion engine. It finds particular application in vehicles in which temperature control of the environment surrounding a battery is advantageous, and will be described with particular reference thereto. However, it is to be appreciated that the present exemplary embodiment is also amenable to other similar applications.

Lead-acid storage batteries are commonly used in electrical systems of automotive vehicles to provide electric energy for operating starter motors to crank engines that power the vehicles. During running of an engine, an alternator that is driven by the engine keeps the battery recharged through an electric regulator. It is generally desirable for the battery to be located in proximity to the engine so that ohmic losses can be minimized during cranking when current draw on the battery is relatively high. Over time, the battery ages, and eventually reaches a point where it is incapable of sustaining sufficient charge to serve the needs of a vehicle.

Heat is a contributor to battery aging, and because an engine in an engine compartment can at times be a source of significant heat, various arrangements have heretofore been proposed to shield the battery from engine heat. For example, it is generally known to associate an engine intake system for an internal combustion engine with a storage battery so that the battery is shielded from heat via the intake airflow. Certain arrangements use blowers and/or other moving parts to accomplish this objective. It is believed that such components increase the cost of a battery protection system and that it would therefore be beneficial if meaningful battery protection could be accomplished without such components. One such passive structure is disclosed in U.S. Pat. No. 5,542,489 which is discussed below.

Referring now to FIG. 1, an engine compartment 10 of a vehicle includes a thermal chamber 12 for holding a battery 14. Thermal chamber 12 receives air via an inlet opening (not shown) through either an ambient air duct 16 or through a hot air duct 18. Air entering thermal chamber 12 exits via an outlet opening 19 through outlet duct 20 which is coupled at a first end to the outlet opening 19 and at a second end to an engine air intake 22. Ambient air duct 16 receives air via convection from outside of the engine compartment 10 and transports the air, which is at a temperature substantially equal to the outside air temperature, into the thermal chamber 12. Hot air duct 18 is coupled to an exhaust manifold (not shown) of the engine to receive heated exhaust gas produced by the engine. Air travelling through thermal chamber 12 is filtered by air filter 24 before entering outlet duct 20. The air filtered by filter 24 is sucked into the intake manifold 22 of the vehicle engine. Use of air ducts 16, 18 and 20 for transporting air to the intake manifold advantageously reduced components in the engine compartment, thus saving space and reducing cost.

A lid 26 which is mounted on the interior 27 of engine compartment hood 28 functions as a filter cover to seal the thermal chamber from air and dust in the engine compartment when the hood 28 is in a closed position. As seen in FIG. 1, opening of the engine compartment hood advantageously opens the thermal chamber 12, thus providing access to the battery as well as other engine components. Battery 14 is secured inside the thermal chamber 12 by way of a clamp 30 which is shaped to fit into a groove 32 on the battery. The clamp 30 is secured to the thermal chamber 12 by a bolt 34. A similar clamp mounted to the thermal chamber is positioned on the opposite side of the battery and fits into a groove similar to groove 32.

One shortcoming associated with the use of this type of system is that it can feed water and snow into the engine. The present disclosed embodiment advantageously reduces the amount of water and snow that reach the engine yet provides battery cooling.

BRIEF DESCRIPTION

Various details of the present disclosure are hereinafter summarized to provide a basic understanding. This summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

According to a first embodiment, an engine compartment of an automotive vehicle is provided. The compartment comprises an internal combustion engine including an air intake manifold and an electrical storage battery. The battery is housed in a storage box and an air intake system supplies air to the air intake manifold and the battery storage box. The air intake system has an inlet supplying air to a flow diverter. The flow diverter has a main channel including a bend dividing the main channel into a first passage and a second passage. The second passage is in fluid communication with the air intake manifold. The flow diverter includes an outlet facing the first passage which is in fluid communication with the battery storage box.

According to a second embodiment, a device for cooling the battery of an automotive vehicle powered by an internal combustion engine is provided. The device comprises an air flow diverter having an inlet side, a primary channel and an outlet side. The primary channel directs air from the inlet side to the outlet side and includes a bend. A secondary channel intersects the primary channel and provides fluid communication with a battery box. The secondary channel has an axis substantially parallel to the axis of the inlet side of the primary channel.

According to a third embodiment, an air intake system for an automotive vehicle is provided. The system includes an inlet in fluid communication with the exterior of the vehicle. The inlet is also in fluid communication with a passage divided by a wall into a first channel in fluid communication with a battery box and a second channel in fluid communication with an engine manifold.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

Figure 1:
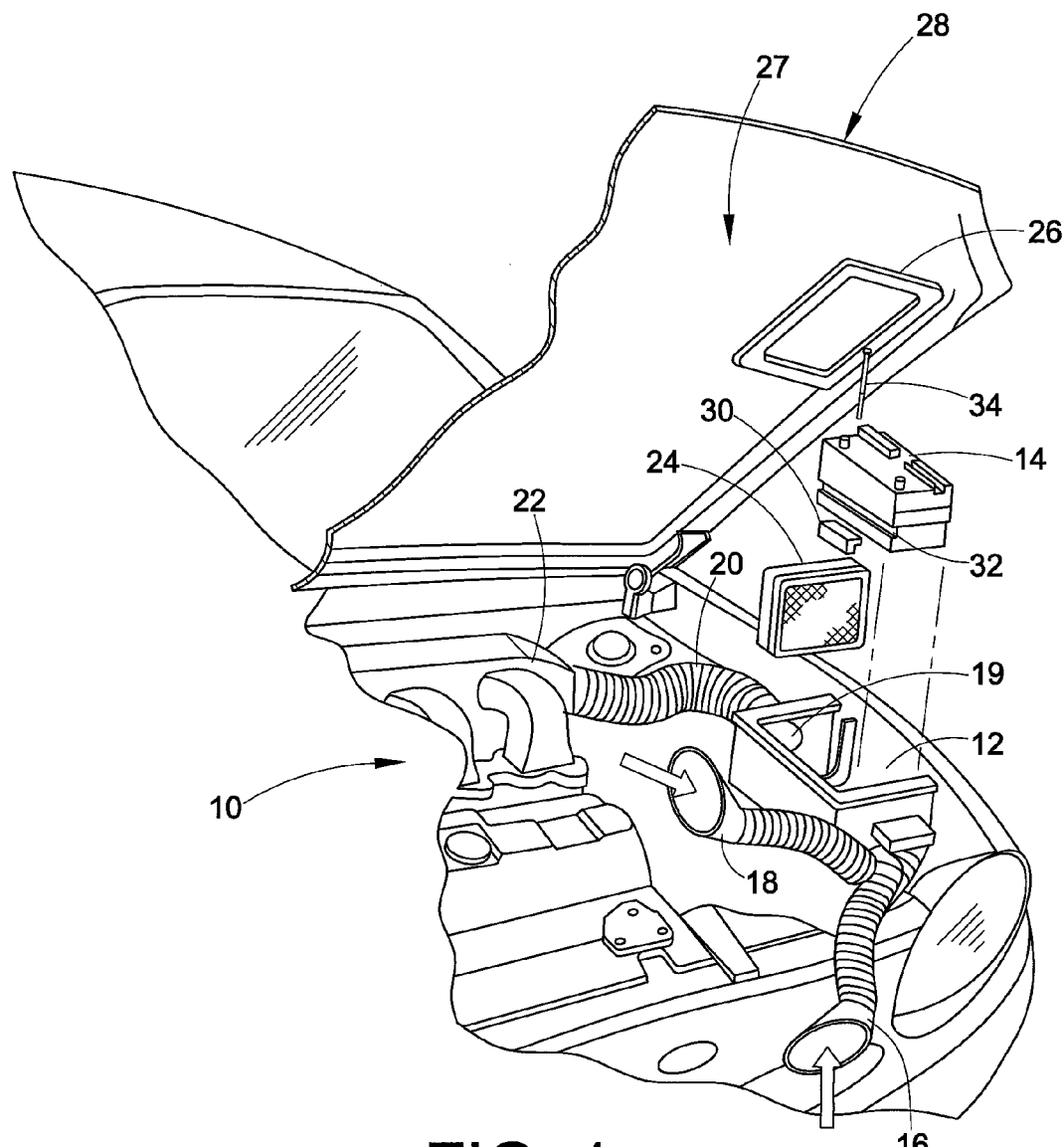
FIG. 1 is a perspective view of a prior art engine compartment including a temperature control system for a battery.
Figure 2:
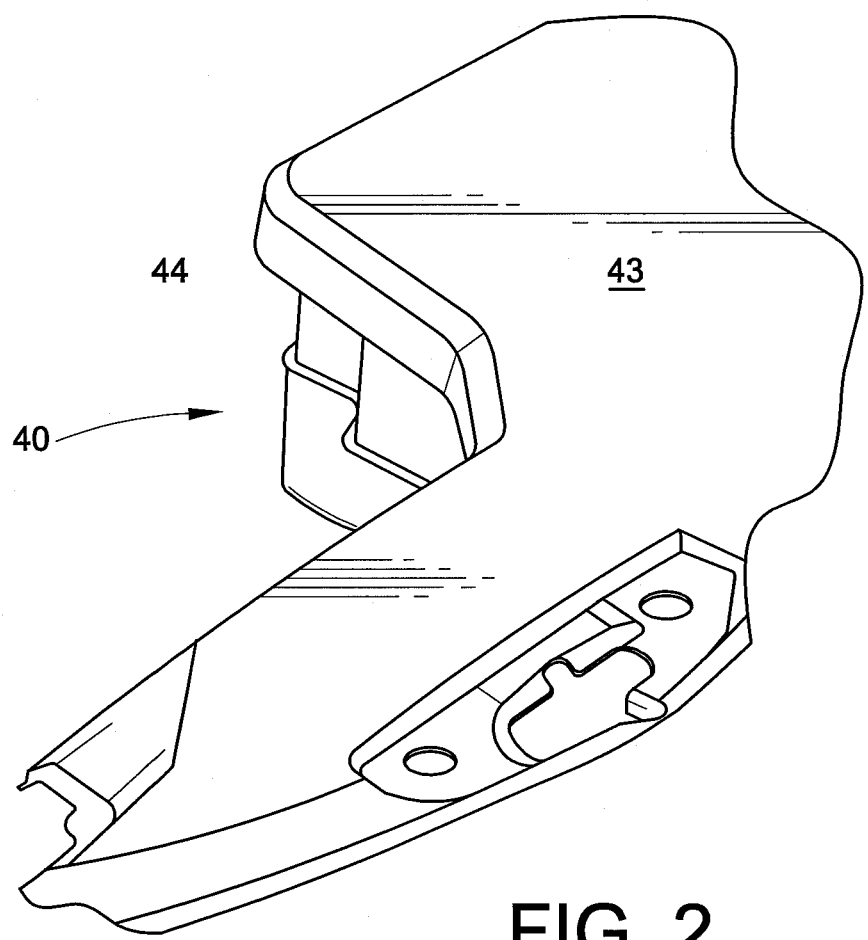
FIG. 2 is a perspective view of the air intake and battery box of the present disclosure.
Figure 3:
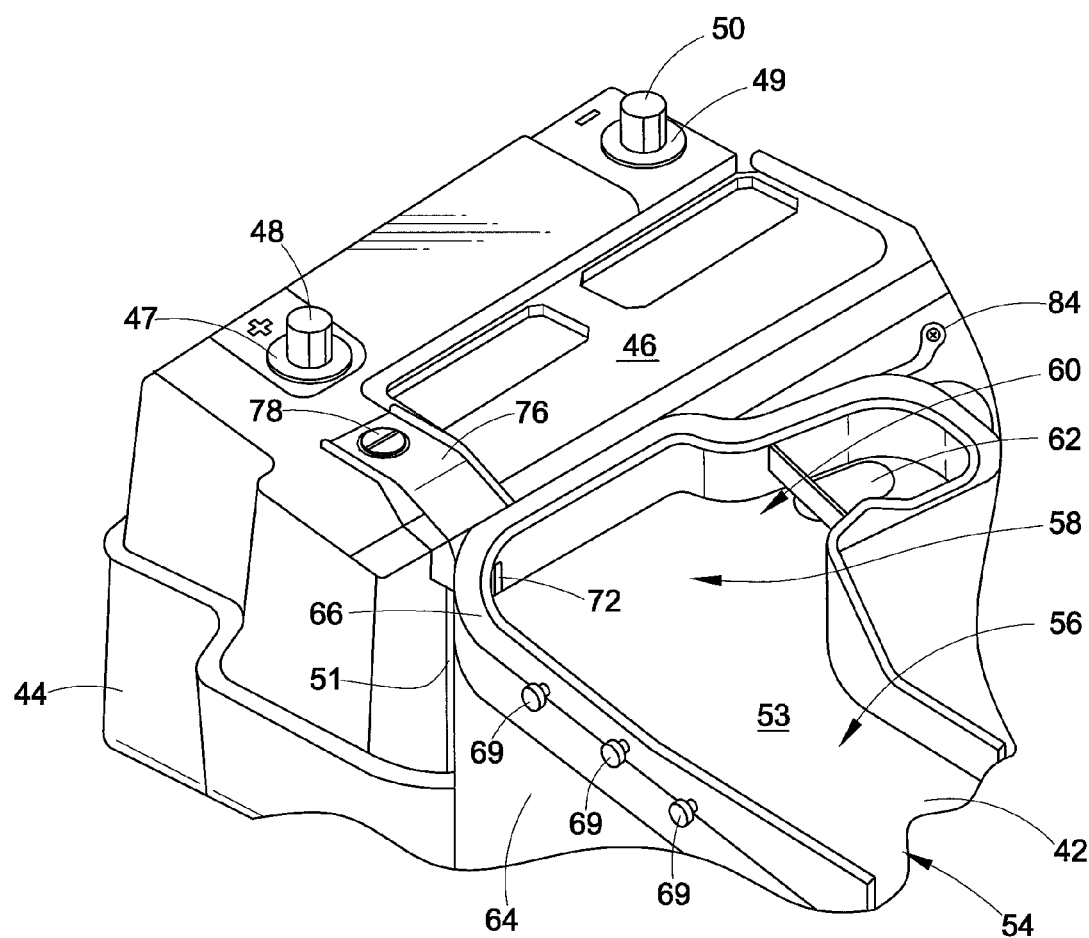
FIG. 3 is a front perspective of the intake diverter of FIG. 2 having the cover removed.
Figure 4:
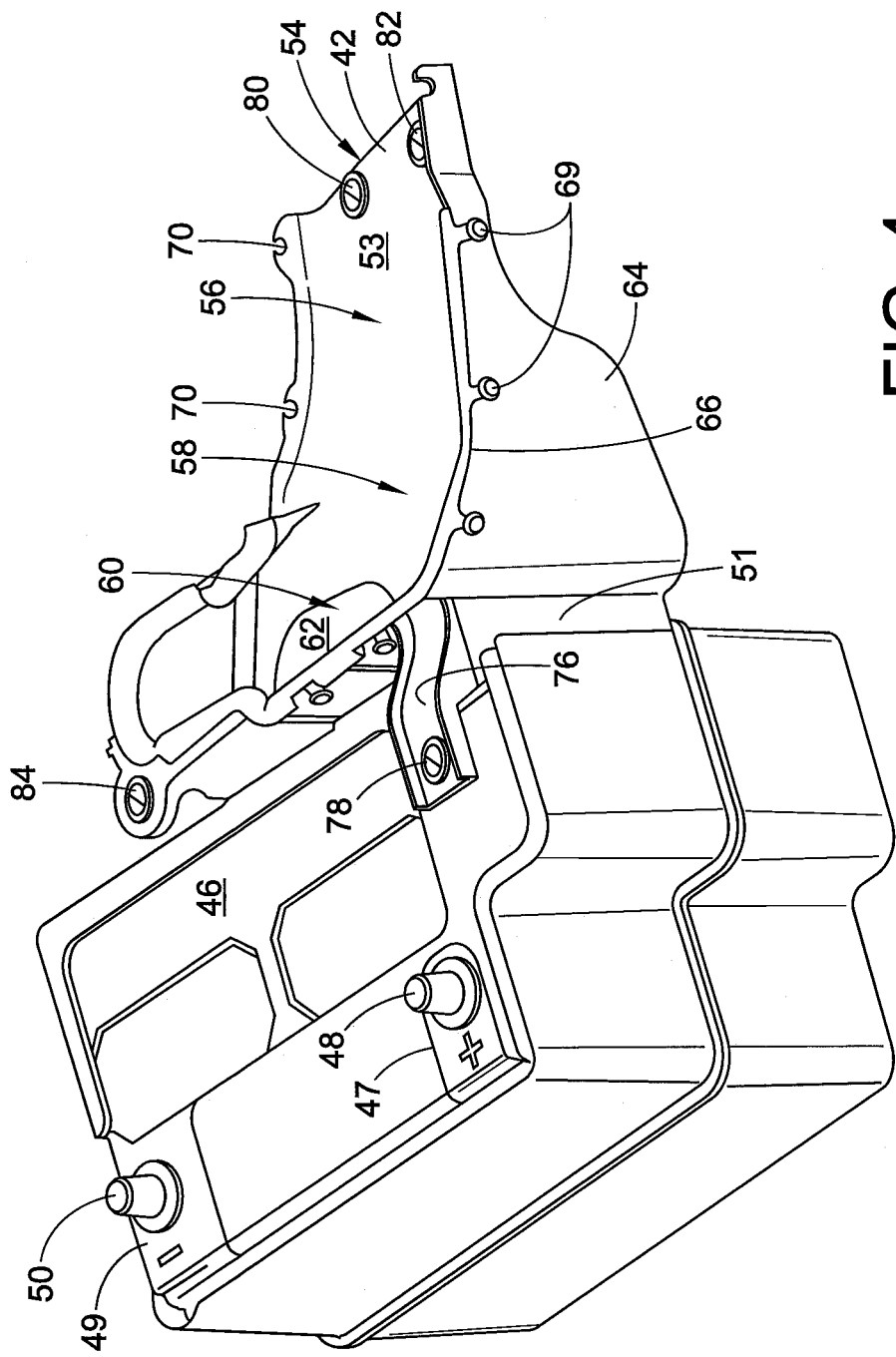
FIG. 4 is a rear perspective view of the air intake and battery box of the present disclosure wherein the cover has been removed.
Figure 5:
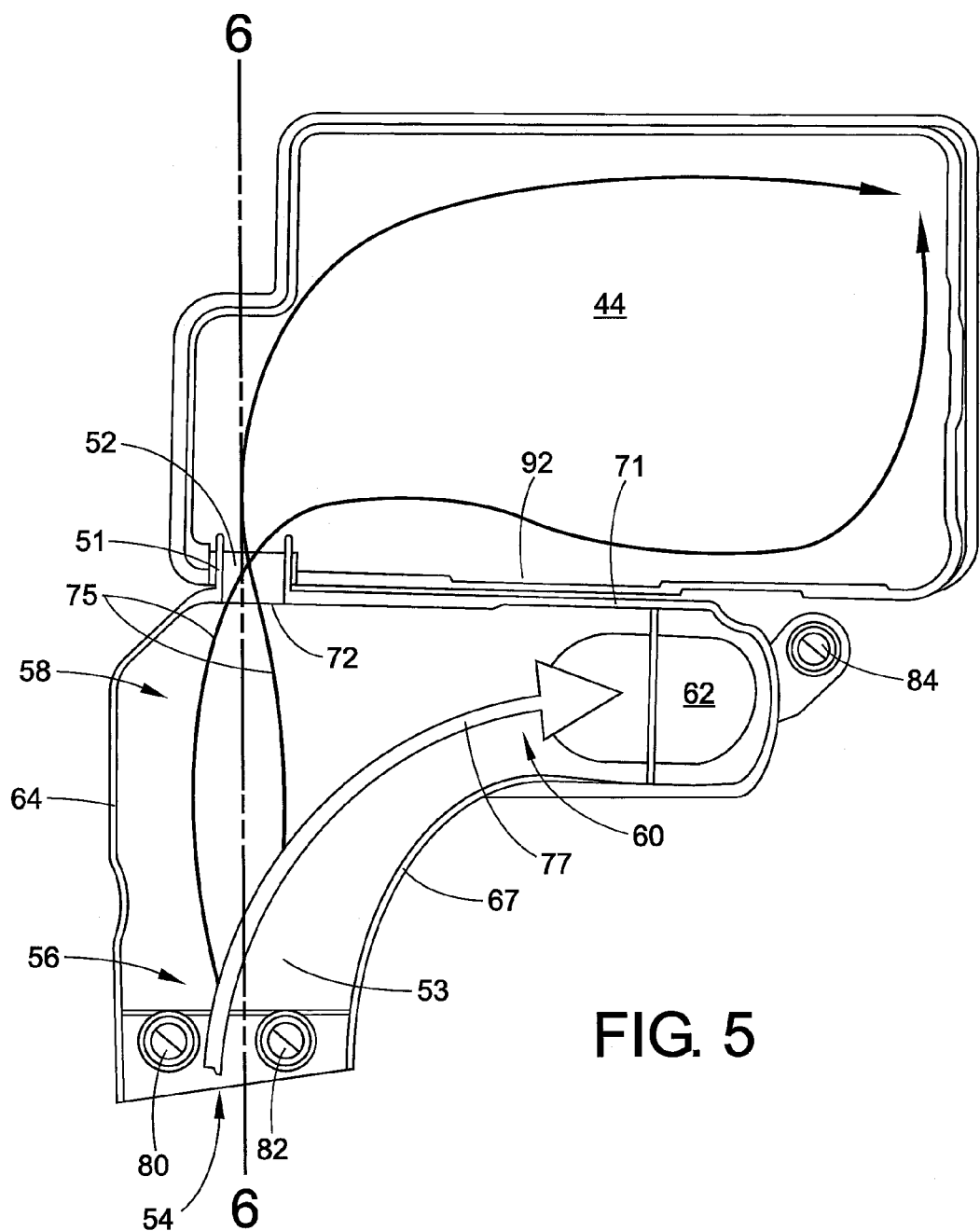
FIG. 5 is a top cross-section view of FIG. 3 (battery removed)
Figure 6:
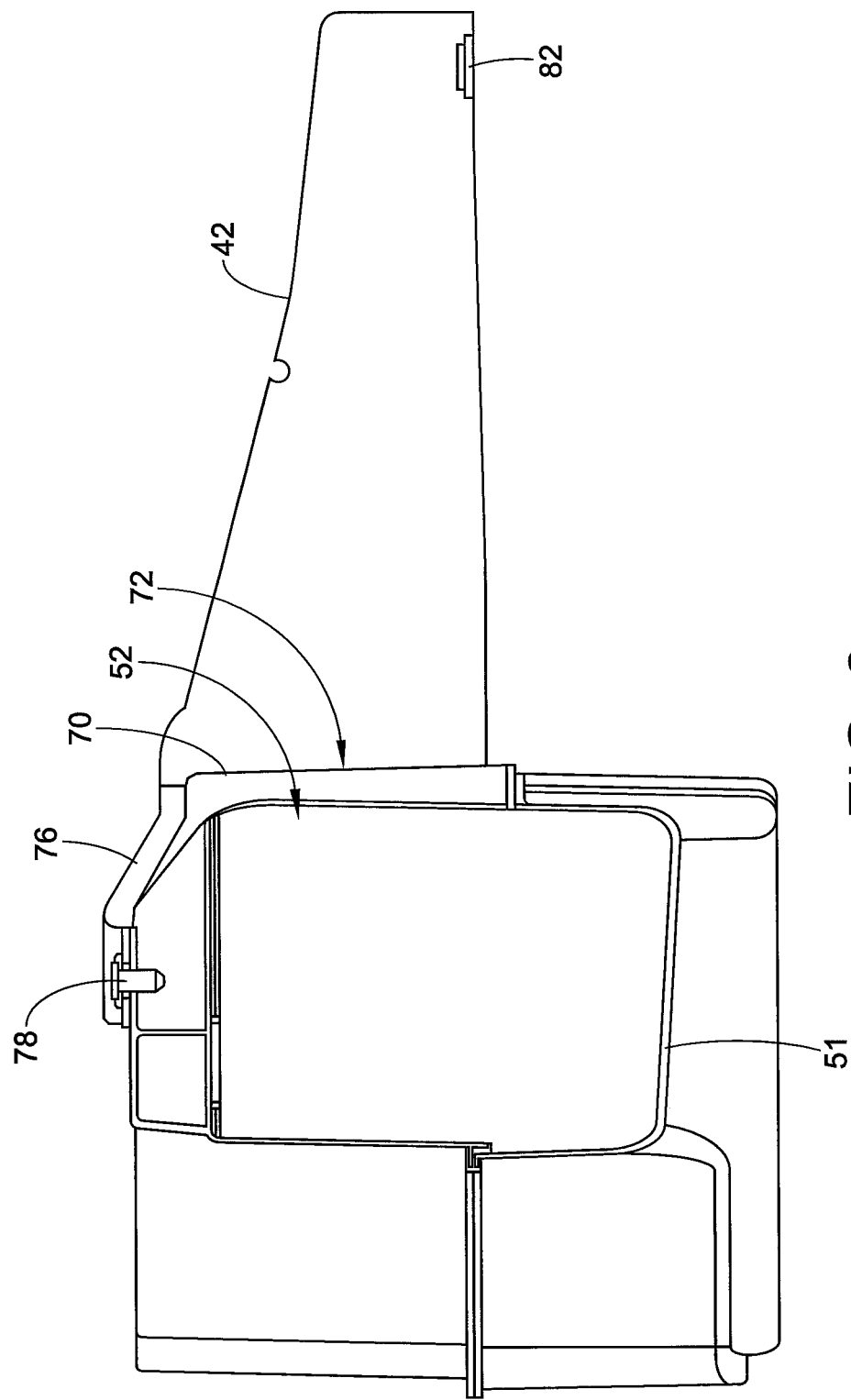
FIG. 6 is a side-view cross-section of FIG. 4, taken along line 6-6.

One or more embodiments or implementations are hereinafter described in conjunction with the drawings, where like reference numerals are used to refer to like elements throughout, and where the various features are not necessarily drawn to scale.

It is noted that the engine environment of FIG. 1 represents a typical engine compartment of an automotive vehicle within which the device of the present disclosure is designed to function.

Referring now to FIGS. 2-6, a symbiotic engine air intake system and battery box coolant device 40 is depicted. Device 40 includes air flow diverter 42 disposed below cover 43 and a battery box 44. Battery box coolant device 40 can be disposed across a front of an engine compartment. For example, it can be mounted to a transverse frame element commonly referred to as a bulk head. The bulk head is generally a structural frame member such as a u-shaped steel bar that traverses a front region in the engine compartment along its top region. Battery box coolant device can be disposed above the bulk head and can be attached directly to the bulk head via hardware such as bolts and other common connectors. The battery box coolant device 40 can include an inlet passing above the bulk head through any traditional automobile components such as a grill etc.

Cover 43 provides a mechanism to seal the battery box 44 and diverter 42. The cover 43 may engage the bulk head, the walls of the engine compartment or may form a component of the vehicle hood (not shown). Cover 43 is selectively removable. Battery box 44 contains battery 46. Battery box 44 can be comprised of plastic as is conventional in the art. Similarly, diverter 42 and cover 43 can be comprised of molded plastic.

Battery box 44 includes passages 47 and 49 allowing access to positive terminal 48 and negative terminal 50, respectively. Battery box 44 includes extension 51 which defines an orifice 52 that receives air flow from diverter 42, as more fully described herein below.

More particularly, diverter 42 includes a main channel 53 having a first inlet end 54 suitable for mating with an air inlet duct (not shown). Main channel 53 in diverter 42 includes an upstream inlet side passage 56, a bend portion 58 and a downstream outlet side passage 60 (upstream and downstream being defined as the respective position to the bend 58). Downstream outlet side passage 60 terminates at an outlet 62 in fluid communication with the engine manifold (not shown). The bend 58 can be of any degree but a range of 50-130° is believed suitable. Bend portion 58 can be provided with an arcuate inner wall 67.

Diverter 42 is constructed of a lower body 64 and a gasket 66 for mating with cover 43. Gasket 66 is provided with multiple projections 69 and notches 70 facilitating a snap-fit joinder between lower body 64 and cover 43. Gasket 66 can be secured via sealant to lower body 64. Of course, an alternative construction with sealant to cover 43 and tongue-groove attachment to lower body 64 is equally feasible. Outer wall 71 of the diverter 42 includes a secondary outlet 72 which is mated to battery box extension 51 in fluid communication with orifice 52. In this manner, an air flow path 75 into battery box 44 is created in addition to the main air flow path 77 into the engine manifold. Of course, the orifice component of the battery box could be constructed as an extension from the diverter or even as a separate intermediate component.

By providing a bend portion 58 in the main channel 53, the airflow path 75 into the battery box is relatively straight while the airflow path 77 continuing in the diverter 42 to outlet 62 is curvilinear. Advantageously, water and other particulate in the air flow is preferentially directed into the battery box. Moreover, heavier elements (water and snow for example) in the airflow tend to follow the inertia of the relatively straight flow path into the battery box. The longitudinal axis of battery box extension 51 is generally parallel to the longitudinal axis of upstream inlet side passage 56. The battery box can be equipped with a drain mechanism to facilitate removal of entrapped water.

A means for securing diverter 42 to battery box 44 includes a tongue 76 secured via a screw 78 to the battery box 44. The diverter 42 is further secured to elements of the engine compartment such as the bulk head, via bolts 80 and 82 adjacent the inlet end 54 and an outlet end bolt 84. By having outer wall 71 abut a side wall 92 of the battery box, a robust package can be provided. This can be achieved when the bend in the diverter 42 is approximately 90°, such that outer wall 71 and side battery box wall 92 are substantially parallel.

Figure 7:
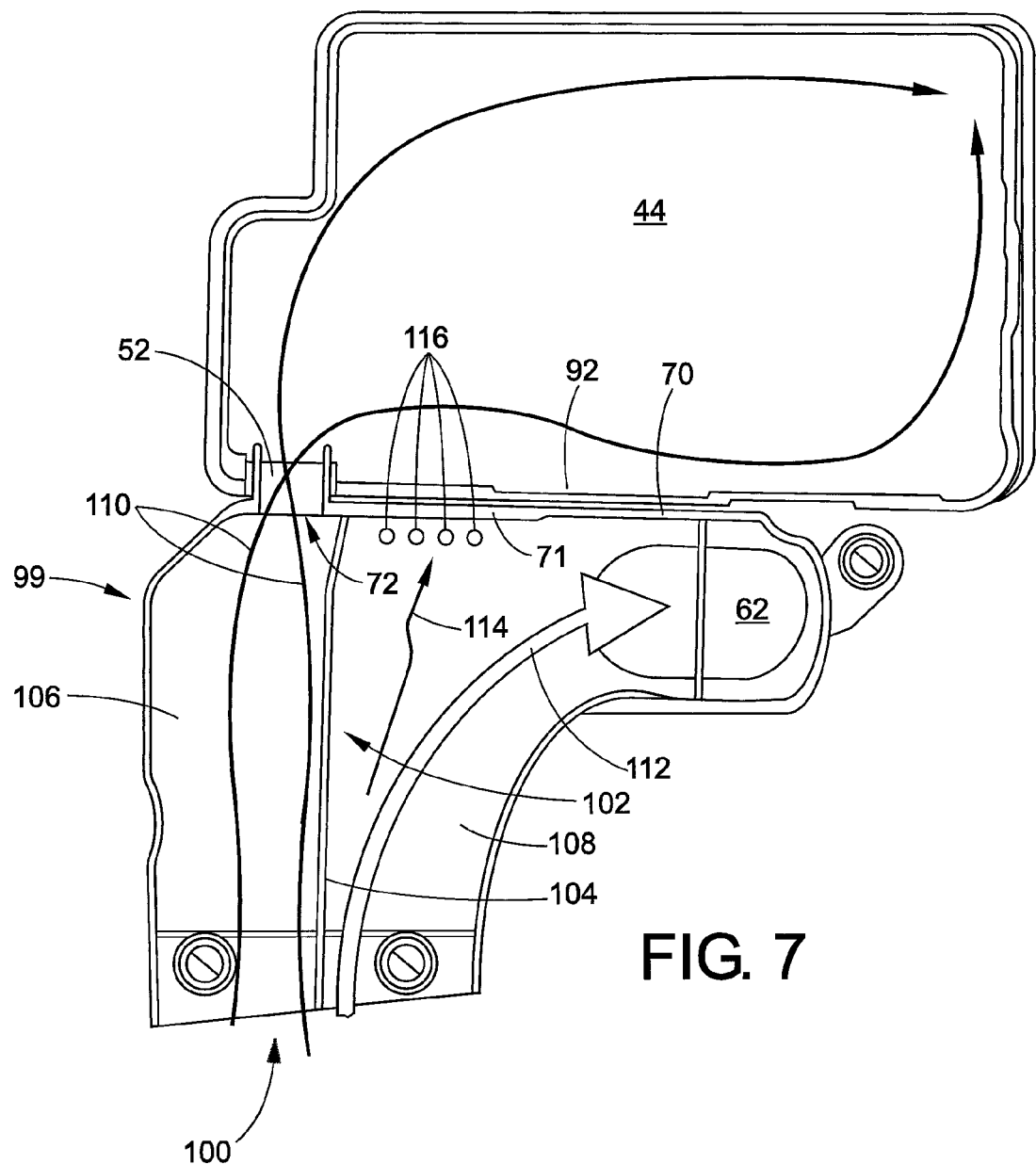
FIG. 7 is a top cross-section view of an alternative diverter configuration.

Referring now to FIG. 7, an alternative diverter assembly 99 is depicted. Inlet 100 is in fluid communication with a channel 102 divided into two passages via a wall 104. Passage 106 is in fluid communication with a battery box 44 providing relatively cool air thereto. Passage 108 is in fluid communication with the inlet 62 to the manifold of the combustion engine. Passage 106 generally provides a relatively straight path 110 into battery box 44 via battery box inlet 52 and diverter outlet 72. In contrast, passage 108 provides an angled path 112. In this manner, snow or other particulate present in the incoming airflow will most likely follow flow path 114 and impact rear wall 71 of diverter 99. Snow, water and other particulate can agglomerate adjacent impact with wall 71 and eventually exit the diverter 99 via drainage outlets 116. Although not shown, diverter assembly 99 would include a cover 43 similar to what is provided with device 40.

The diverter assembly 99 can be secured to the bulk head or the vehicle hood. Dividing wall 104 can be integral to the diverter assembly 99 or separately secured to the hood to provide the desired divided flow in a hood closed condition. In addition, it is noted that direct passage of air to an air filter chamber downstream of the diverter and prior to entering the engine manifold is also feasible.

The exemplary embodiments have been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An engine compartment of an automotive vehicle comprising an internal combustion engine including an air intake manifold and an electrical storage battery, said battery housed in a storage box, an air intake system supplying air to said air intake manifold, said air intake system comprising an inlet supplying air to a flow diverter, said flow diverter including a base member and a cap member, said flow diverter having a main channel including a bend dividing said main channel into a first passage and a second passage, said second passage in fluid communication with said air intake manifold, said flow diverter further including an outlet facing said first passage in fluid communication with the battery storage box.

2. The engine compartment of claim 1, wherein said bend forms an angle between said first and second passages of between about 50 and 130°.

3. The engine compartment of claim 1 wherein said second passage includes an outer wall abutting a side wall of said battery box.

4. The engine compartment of claim 1 wherein said battery box includes a battery box orifice having an axis substantially parallel to said first passage in fluid communication with said outlet.

5. The engine compartment of claim 1 wherein said diverter includes at least one element adapted for mating with said battery box.

6. The engine compartment of claim 2 wherein said angle is about 90°.

7. The engine compartment of claim 1 wherein a diameter of said first passage is greater than a diameter of said second passage.

8. The engine compartment of claim 1 including a gasket inbetween said base and cap member.

9. The engine compartment of claim 1 wherein said cap member further covers said storage box.

10. The engine compartment of claim 1 wherein said base member includes a plurality of projections receiving said cap member.

11. A device for cooling a battery of an automotive vehicle powered by an internal combustion engine comprising an air flow diverter having an inlet side receiving an air flow from outside the vehicle, a primary channel and an outlet side, said primary channel directing air from the inlet side to the outlet side and including a bend, said diverter including a secondary channel intersecting the primary channel, said secondary channel opening to an interior of a battery box such that the air flow is provided on a surface of the battery, said secondary channel having an axis substantially parallel to the axis of the inlet side of said primary channel.

12. The device of claim 11 wherein secondary channel is oriented in line with said primary channel upstream of said bend.

13. The device of claim 11 wherein said bend comprising an angle between approximately 50 and 130°.

14. The device of claim 11 wherein diverter is mechanically joined to said battery box.

15. The device of claim 14 wherein said primary channel downstream of said bend is oriented parallel to a side wall of said battery box.

16. The device of claim 14 wherein said secondary channel is a component of said battery storage box.

17. The device of claim 11 wherein said bend comprises an arcuate inner corner and a relatively sharper outer corner.

* * * * *